United States Patent
Chauzy et al.

(10) Patent No.: US 10,526,214 B2
(45) Date of Patent: Jan. 7, 2020

(54) PROCESS AND PLANT FOR THERMAL HYDROLYSIS OF SLUDGE

(71) Applicant: Veolia Water Solutions & Technologies Support, Saint-Maurice (FR)

(72) Inventors: Julien Chauzy, Antony (FR); Malik Djafer, Boulogne-Billancourt (FR); Cedric Crampon, Champigny-sur-Marne (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 205 days.

(21) Appl. No.: 15/520,437

(22) PCT Filed: Oct. 30, 2015

(86) PCT No.: PCT/EP2015/075267
§ 371 (c)(1),
(2) Date: Apr. 20, 2017

(87) PCT Pub. No.: WO2016/066809
PCT Pub. Date: May 6, 2016

(65) Prior Publication Data
US 2017/0327387 A1    Nov. 16, 2017

(30) Foreign Application Priority Data
Oct. 31, 2014  (FR) ...................................... 14 60500

(51) Int. Cl.
*C02F 1/02*      (2006.01)
*C02F 1/34*      (2006.01)
(Continued)

(52) U.S. Cl.
CPC ................ *C02F 1/025* (2013.01); *C02F 1/34* (2013.01); *C02F 11/18* (2013.01);
(Continued)

(58) Field of Classification Search
CPC .. C02F 1/025; C02F 1/34; C02F 11/06; C02F 11/08; C02F 11/086; C02F 11/18;
(Continued)

(56) References Cited

U.S. PATENT DOCUMENTS 4,983,296 A * 1/1991 McMahon ............... C02F 11/10
                                                    210/603
8,491,680 B2   7/2013 Shaw et al.
(Continued)

*Primary Examiner* — Lucas A Stelling
(74) *Attorney, Agent, or Firm* — Coats & Bennett, PLLC

(57) ABSTRACT

Method and installation of thermal hydrolysis of sludges implementing a group of thermal hydrolysis reactors (71, 72,73,74) characterized in that it comprises successions of cycles, each of these successions of cycles being dedicated to one of said thermal hydrolysis reactors, each cycle comprising: a step a) for conveying a batch of non-preheated sludges to be treated into a thermal hydrolysis reactor (71,72,73,74), said step for conveying comprising the continuous passage of the sludges of said batch of sludges into a dynamic mixer (3) into which recovery steam is injected; a step b) for injecting live steam into said thermal hydrolysis reactor (71,72,73,74) containing said batch of sludges so as to increase the temperature and the pressure prevailing in this reactor; a step c) of thermal hydrolysis of the batch of sludges in the thermal hydrolysis reactor; a step d) for emptying the content of the batch of hydrolyzed sludges of said thermal hydrolysis reactor towards a recovery vessel (13), and for concomitant de-pressurizing of said reactor prompting the emission of recovery steam from the recovery vessel (13); the cycle starting points of the successions of cycles being staggered in time so that the steps a) of a succession of cycles are concomitant with the steps d) of (Continued)

another succession of cycles, the recovery steam emitted during the steps d) of a succession of cycles constituting the recovery steam injected during the steps a) of another succession of cycles.

15 Claims, 4 Drawing Sheets

(51) Int. Cl.
*C02F 11/18* (2006.01)
*C02F 101/30* (2006.01)

(52) U.S. Cl.
CPC .... *C02F 2101/30* (2013.01); *C02F 2201/005* (2013.01); *C02F 2209/02* (2013.01); *C02F 2301/046* (2013.01); *C02F 2303/06* (2013.01); *C02F 2303/10* (2013.01); *Y02W 10/30* (2015.05)

(58) Field of Classification Search
CPC ............ C02F 2101/30; C02F 2201/005; C02F 2209/02; C02F 2301/046; C02F 2303/06; C02F 2303/10; Y02W 10/30
See application file for complete search history.

(56) References Cited

U.S. PATENT DOCUMENTS

| | | |
|---|---|---|
| 9,506,334 B2 | 11/2016 | Higgins et al. |
| 2004/0060863 A1 | 4/2004 | Hojsgaard et al. |
| 2011/0114570 A1* | 5/2011 | Hojsgaard ............... C02F 11/18 210/752 |
| 2012/0111515 A1 | 5/2012 | Nilsen et al. |
| 2014/0262254 A1 | 9/2014 | Smith |
| 2014/0263057 A1 | 9/2014 | Smith et al. |
| 2016/0185640 A1 | 6/2016 | Crampon et al. |
| 2016/0221846 A1 | 8/2016 | Smith et al. |

* cited by examiner

PROCESS AND PLANT FOR THERMAL HYDROLYSIS OF SLUDGE

This application is a U.S. National Stage Application of PCT Application No. PCT/2015/075267, with an international filing date of 30 Oct. 2015. Applicant claims priority based on French Patent Application No. 1460500 filed 31 Oct. 2014. The subject matter of these applications is incorporated herein.

FIELD OF THE INVENTION

The invention relates to the field of the treatment of effluents constituted by or highly charged with fermentable organic matter and especially sludges derived from the processes of urban or industrial wastewater depollution. These effluents are here below generally designated by the term "sludges".

PRIOR ART

At present, a part of the sludges produced by purification stations is recycled in agriculture domain and another part is incinerated or treated in other ways. However, these sludges increasingly have to be subjected to treatment in specific systems.

Since the production of these sludges is getting bigger, it is indeed necessary that they should entail no danger to the environment and human health. In fact, these sludges contain germs, some of which are pathogenic (coliform bacteria, *salmonella*, helminth eggs, etc). In addition, they are highly fermentable and cause the production of gases (amines, hydrogen sulfide, mercaptans, etc) which give rise to olfactory nuisance. These considerations explain the need to implement at least one step, in the treatment systems indicated here above, for stabilizing these sludges in order to obtain sludges that no longer evolve or at any rate evolve less rapidly in biological terms as well as in physical/chemical terms.

A major concern relates to the desire to reduce the volume of these sludges and/or to recycle the sludges in the form of biogas.

Among the methods proposed in the prior art to process these sludges, thermal hydrolysis is considered to be particularly promising.

The thermal hydrolysis of sludges consists in treating these sludges at a high temperature and under pressure so as to hygienize them (i.e. greatly reduce their content in microorganisms, especially pathogenic microorganisms), solubilize a major part of the particulate matter and convert the organic matter that they contain into easily soluble, biodegradable matter (volatile fatty acids for example).

Such a technique of thermal hydrolysis of sludges could be planned upstream or downstream to a step of anaerobic digestion. When the thermal hydrolysis is planned downstream, it will frequently be called "hydrothermal carbonization", the term used by those skilled in the art.

A particularly efficient technique has been proposed for the hydrolysis of sludges, and is described in FR2820735. This technique implements at least two reactors working in parallel, in each one of which batches of sludges undergo a full cycle of thermal hydrolysis.

Each of the cycles of thermal hydrolysis implemented in a reactor comprises the steps for feeding the sludges to be treated into the reactor, injecting recovered steam (flash steam) therein to recover the heat from the sludges, injecting live steam into the sludges to bring them to a pressure P and to a temperature T enabling hydrolysis, maintaining them at this pressure P and this temperature T for a certain time, bringing the sludges to a pressure close to the atmospheric pressure in releasing flash steam which is recycled to preheat the sludges to be treated from the reactor in parallel and emptying the reactor of the sludges thus hydrolyzed.

According to this technique, it is planned that the cycles should be staggered in time from one reactor to the other to use the flash steam produced from one reactor to inject it into the other reactor. Such an implementation makes it possible to use the flash steam produced in one of the reactors to feed the other reactor with steam.

This technique implements a feeding with sludge to be treated and a emptying of the sludges, these steps being possibly continuous, and a thermal hydrolysis in batches of sludges using several thermal hydrolysis reactors.

Such a method can be implemented in simple plants, the steps for filling, hydrolysis, depressurization and emptying being performed in the same reactor. It thus minimizes the speed of clogging of these plants, minimizes odors in the absence of a passage of sludges from one reactor to the other and reduces live steam requirements.

However, according to this technique, flash steam is injected via a steam injector for injecting steam into the sludge bed of the reactor. Such a configuration leads to major load losses. These losses are due, on the one hand, to the configuration of the steam injector and, on the other hand, to the height of the sludges in the reactor above the injector. These load losses must be compensated by the use of flash steam at greater pressure to obtain an efficient transfer of energy into the sludges.

Finally, such a method leads to the need to implement major volumes of reactors.

The document EP1198424 also proposes a method for the continuous treatment of sludges in which already preheated sludges are pumped and then again preheated in a preheating reactor before being again pumped towards a thermal hydrolysis reactor and then transferred into a de-pressurizing tank producing flash steam.

In such a method, the heat of the hydrolyzed sludges is used, by means of a heat exchanger, to preheat the sludges before injecting flash steam from the de-pressurizing tank into these sludges and treating them in a preheating reactor.

Such a technique has the drawback of implementing, in addition to a heat exchanger, three reactors namely a preheating reactor, a thermal hydrolysis reactor and a de-pressurizing reactor. The corresponding plants are therefore complex and bulky. The time of treatment of the sludges is in addition relatively lengthy, since the sludges have to travel successively in three reactors with a possibly lengthy retention time in each of them.

It will also be noted that such a technique calls for the use of a pump for recirculating hydrolyzed sludges from the de-pressurizing reactor to the heat exchanger and then from an intermediate pump to convey sludges from the preheating reactor to the thermal hydrolysis reactor.

Whatever the method of thermal hydrolysis used, the main cost/expenditure item is related to the quantity of steam injected into the sludges. With regard to sizing, this affects the size of the steam production installations (boiler, steam generator, steam recovering unit, piping, etc) implemented for this purpose. With regard to operations, this influences the consumption of fuel needed to generate steam. It is therefore important to achieve the utmost possible reduction of the steam implemented for treating sludges.

The quantity of steam to be injected into sludge in order to carry it to the desired temperature to carry out its thermal hydrolysis is linked to its dry matter concentration. Sludges are indeed constituted by a mixture of dry matter and water. During the heating of the sludges, it is therefore necessary to increase the temperature of both the dry matter and the water. The result of this is that the lower the concentration of the sludge, i.e. the lower its dryness, the greater the volume of the sludge to be treated and therefore the greater the quantity of live steam needed for the heating. This gives rise to an increase in live steam consumption and therefore an increase in fuel consumption (biogas, fuel oil, natural gas, etc) used to produce this live steam. In addition, the risk of emanation of odors at all levels of the sludge treatment system is all the greater as the volume of the hydrolyzed sludges is high. It is therefore appropriate to process the most highly concentrated sludges possible, i.e. sludges having high dryness, in order to limit the consumption of steam and reduce the production of hydrolyzed sludges and therefore the emanation of odors. The transfer of the steam in a highly concentrated sludge however raises a problem. Indeed, it is especially noted that, in existing methods, the transfer of steam into highly concentrated sludges is not optimal. This problem of transferring steam is encountered especially when injecting flash steam into the sludges to be treated, at the beginning of the thermal hydrolysis. This can be explained by the fact that the transfer of steam into sludges is related to their concentration, this transfer being especially low when the concentration of sludges is high. The concentration of sludges to be treated should therefore not be too high in order not to hinder the transfer of steam, especially that of flash steam. Ultimately, the optimizing of the thermal hydrolysis of the sludges in terms of reduction of steam consumption implies considering the following two antagonistic factors:
  the higher the concentration of the sludge, the lower the volume to be treated (and the lower the risks of odors) and the lower the quantity of steam to be injected to heat these sludges,
  BUT the greater the concentration of the sludge, the more difficult it is to carry out the transfer of steam and therefore to use a small quantity of steam: there is therefore a limit noted in the prior-art methods by which the sludges are not concentrated beyond a certain value. If not there is the risk of having poor transfer and very high steam consumption.

In order to limit the consumption of steam while improving the efficiency of the thermal hydrolysis of the sludges, especially those having high dryness, another method of thermal hydrolysis described in FR2990429 is proposed. Such a method is carried out in at least two reactors working in parallel, in each of which the sludges undergo a complete cycle of thermal hydrolysis, said cycle being staggered or offset in time for one reactor to another, to use the flash steam produced from one reactor in order to inject it into the other reactor. The method comprises a step for extracting a part of the sludges contained in a thermal hydrolysis reactor and then in reintroducing it into this reactor, i.e. it consists in recirculating a part of the content of a thermal hydrolysis reactor into itself. This improves the transfer of steam into the sludges.

Such a method however does not give full satisfaction. Indeed, it leads to lengthening the duration of the cycles and therefore to increasing the size of the plants implementing it. In addition, it leads to introducing flash steam into the non-preheated sludges, and this does not favor the thermal transfer of steam towards the sludges. In practice, it is necessary to keep, in each thermal hydrolysis reactor, a "quantity" of hot sludges which represents about 10% of the volume of the reactor and to limit the filling of these reactors. Under heat, the reactors cannot be filled beyond 70% of their capacity by volume. Finally, the dryness of the sludges that can be treated by this method remains, in practice, limited to 16% to 18% of dry matter.

Other methods of the prior art implement a reactor for preheating sludges upstream to the thermal hydrolysis reactor. However, these methods have flash steam injectors at the lower part of the preheating reactor, means for homogenization such as a recirculation pump and means for conveying preheated sludges into the thermal hydrolysis reactor. The time of retention of the preheated sludges in this preheating reactor requires a major volume of preheating reactor.

Goals Of The Invention

The invention is aimed at overcoming at least certain of the drawbacks of the prior art referred to here above.

In particular, it is a goal of the invention to provide a method of thermal hydrolysis of sludges that can be used, in at least one embodiment, as compared with the prior-art methods, to improve the transfer of energy provided by flash steam and live steam to the sludges and thus to improve the thermal hydrolysis of these sludges.

It is another goal of the present invention to describe a method of this kind that improves this transfer of energy to non-preheated sludges.

It is yet another goal of the present invention to propose a method of this kind which, in at least certain embodiments, improves such a transfer of energy to sludges having high dryness, and in practice sludges that can show dryness of up to 40%.

It is yet another goal of the invention to propose a method of this kind that can lower the consumption of live steam.

It is yet another goal of the present invention to reduce the temperature of the sludges at the exit from the vessel for recovering said sludges.

It is yet another goal of the invention to propose a method for removing the need for any preheating step that implements a heat exchanger and/or a preheating reactor upstream to the hydrolysis reactors.

It is yet another goal of the invention to describe a plant for implementing a method of this kind which, for equal processing capacities, requires less space than the plants used for implementing methods of the prior art.

In particular, it is a goal of the present invention to describe a plant of this kind that does not implement any preheating tank.

It is also a goal of the present invention to describe a plant of this kind that does not require the use of a heat exchanger to preheat the sludges.

It is also a goal of the invention to propose a plant this kind that does not require any pumping of sludges after their entry into the plant.

SUMMARY OF THE INVENTION

These goals as well as others that shall appear here below are achieved by means of the invention which pertains to a method of thermal hydrolysis of sludges containing organic matter implementing a group of thermal hydrolysis reactors characterized in that it comprises successions of cycles, each of these successions of cycles being dedicated to one of said thermal hydrolysis reactors, each cycle comprising:

a step a) for conveying a batch of non-preheated sludges to be treated into a thermal hydrolysis reactor, said step for conveying comprising the continuous passage of the sludges of said batch of sludges into a dynamic mixer into which recovery steam is injected;

a step b) for injecting live steam into said thermal hydrolysis reactor containing said batch of sludges so as to increase the temperature and the pressure prevailing in this reactor;

a step c) of thermal hydrolysis of said batch of sludges in said thermal hydrolysis reactor;

a step d) for emptying the content of said batch of hydrolyzed sludges of said thermal hydrolysis reactor towards a recovery vessel, and concomitant de-pressurizing of said reactor prompting the emission of recovery steam from said recovery vessel;

the cycle starting points of the successions of cycles being staggered in time so that the steps a) of a succession of cycles are concomitant with the steps d) of another succession of cycles, the recovery steam emitted during the steps d) of a succession of cycles constituting the recovery steam injected during the steps a) of another succession of cycles.

It will be noted that in the present invention, the term "dynamic mixer" is understood to refer to any mixer constituted by a chamber, preferably cylindrical, continuously receiving said sludges, means for conveying steam directly into said chamber and means making it possible to give rise to a vigorous stirring, by means of motor-driven mechanical means, of the different phases entering this chamber. The stirring is strong enough to make it possible to obtain an essentially single-phase mixing of the sludges and of steam. In practice, such means can advantageously be constituted by blades mounted on a rotation shaft driven by a rotor rotating at a speed of over 500 rpm, preferably between 1000 rpm and 2000 rpm. It will be noted that such mechanical stirring means are not designed to push matter into the chamber but only to stir it. Thus, when they include blades, these blades are shaped, according to the knowledge of those skilled in the art, so that putting them into motion does not prompt any forward progress or feeding of material into the chamber. Such a dynamic mixer causes no load loss. It is not a tank, since the chamber has a small volume of a few liters, the residence time of the sludges in this chamber being only a few seconds and the sludges therefore not being retained in this chamber.

Thus, according to the invention, the implementing of such a dynamic mixer during the step a) for conveying sludges into the hydrolysis reactors, favors the transfer of energy from the live steam to the sludges during the step b) and, if necessary, the step c) of the method. Indeed, the de-structuring of the sludges through the dynamic mixer makes it possible to homogenize them and to reduce their viscosity. Thus, the energy is transferred more easily. It is therefore possible to overcome the need for any step of preheating that implements a heat exchanger and/or a preheating reactor upstream to the hydrolysis reactors.

The method according to the invention therefore opens up the possibility of treating the sludges having high dryness. In practice, the sludges to be treated could have a dryness of 10% to 40% by weight of dry matter, advantageously from 15% to 35% by weight of dry matter. To arrive at such levels, the sludges to be treated could be preliminarily slightly diluted.

The method of the invention makes it possible to remove the load losses resulting from the use of steam injectors in the prior art reactors and preheating vessels, and from the height of sludges above these injectors. Thus, with the method according to the invention, it is possible to use steam at lower pressure and thus recover more flash steam.

The method according to the invention could especially be implemented upstream to a step of anaerobic digestion of sludges or downstream to such a step to hygienize the sludges, reduce the final volume of sludges and increase the volume of biogas produced during the digestion step. (As indicated here above, when the method according to the invention is planned downstream to a digestion step, it could be called hydrothermal carbonization.)

Preferably, the method includes a step for discharging non-condensable gases from said thermal hydrolysis reactor during said steps a) or d).

According to one variant, the step a) is implemented by placing said hydrolysis reactor in a state of low pressure to facilitate the discharge of the non-condensable gases.

Also, according to one variant, the duration of the step a) is preferably from 5 to 30 min.

Also, according to one variant, the duration of the step b) is preferably from 5 to 30 min.

Also, according to one variant, the duration of the step c) is preferably from 5 to 120 min, preferably 5 to 30 min.

Also, according to one variant, the duration of the step d) is preferably from 5 to 30 min.

Each succession of cycles could include a pause time between each cycle. This pause time takes place advantageously at the end of the step d) for emptying and depressurizing.

Advantageously, the duration of each cycle is preferably from 20 to 210 min.

Also advantageously, during the step c) of thermal hydrolysis, the temperature of said batch of sludges ranges from 120° C. to 200° C., and even more preferably from 140° C. to 180° C.

Also preferably, during the step c) of thermal hydrolysis, the pressure inside the thermal hydrolysis reactor ranges from 2 to 16 bar(a), and even more preferably, from 3.5 to 10 bar(a).

Equally preferably, the pressure inside the recovery vessel is maintained at 1.1 to 3 bar(a).

Preferably, said step a) is implemented in such a way that, during the step c), the thermal hydrolysis reactor is filled to between 70% and 95% of its total capacity by volume.

The invention also pertains to a plant for treating sludges to implement the method described here above characterized in that it comprises:

means for conveying non-preheated sludges to be treated to at least one dynamic mixer provided with an inlet of recovery steam;

a group of thermal hydrolysis reactors connected to said at least one dynamic mixer and provided with means for conveying live steam and means for discharging hydrolyzed sludge towards at least one recovery vessel;

at least one recovery vessel connected to said thermal hydrolysis reactors and provided with a pipe for discharging recovery steam connected to said inlet of recovery steam of said at least one dynamic mixer; and means for discharging hydrolyzed sludges.

Preferably, said group of thermal hydrolysis reactors comprises 2 to 6 reactors.

According to one variant, the plant comprises:

a common dynamic mixer;

said group of thermal hydrolysis reactors;

means for setting up fluidic communication of said dynamic mixer alternately with each of the thermal hydrolysis reactors of said group;

a common recovery vessel;

means for setting up fluidic communication of said common recovery vessel alternately with each of said thermal hydrolysis reactors of said group and with said common dynamic mixer.

According to one particularly valuable embodiment, said dynamic mixer comprises an essentially cylindrical chamber receiving a blade rotor, said blade rotor rotating preferably at a speed of over 500 rpm, preferably from 1000 rpm to 2000 rpm.

Also advantageously, said thermal hydrolysis reactors are connected to said at least one dynamic mixer by pipes leading into the upper part of said thermal hydrolysis reactors.

Advantageously, said means for conveying live steam into said thermal hydrolysis reactors include pipes opening into the lower part of said thermal hydrolysis reactors.

Preferably, said thermal hydrolysis reactors are provided with means for discharging non-condensable gases.

LIST OF FIGURES

The invention, as well as the different advantages that it presents, will be understood more easily from the following description of one embodiment of the plant and two variants of implementation of a method according to this embodiment, as non-exhaustive examples with reference to the figures, of which:

DESCRIPTION OF EMBODIMENTS OF THE INVENTION

Plant

Figure 1:
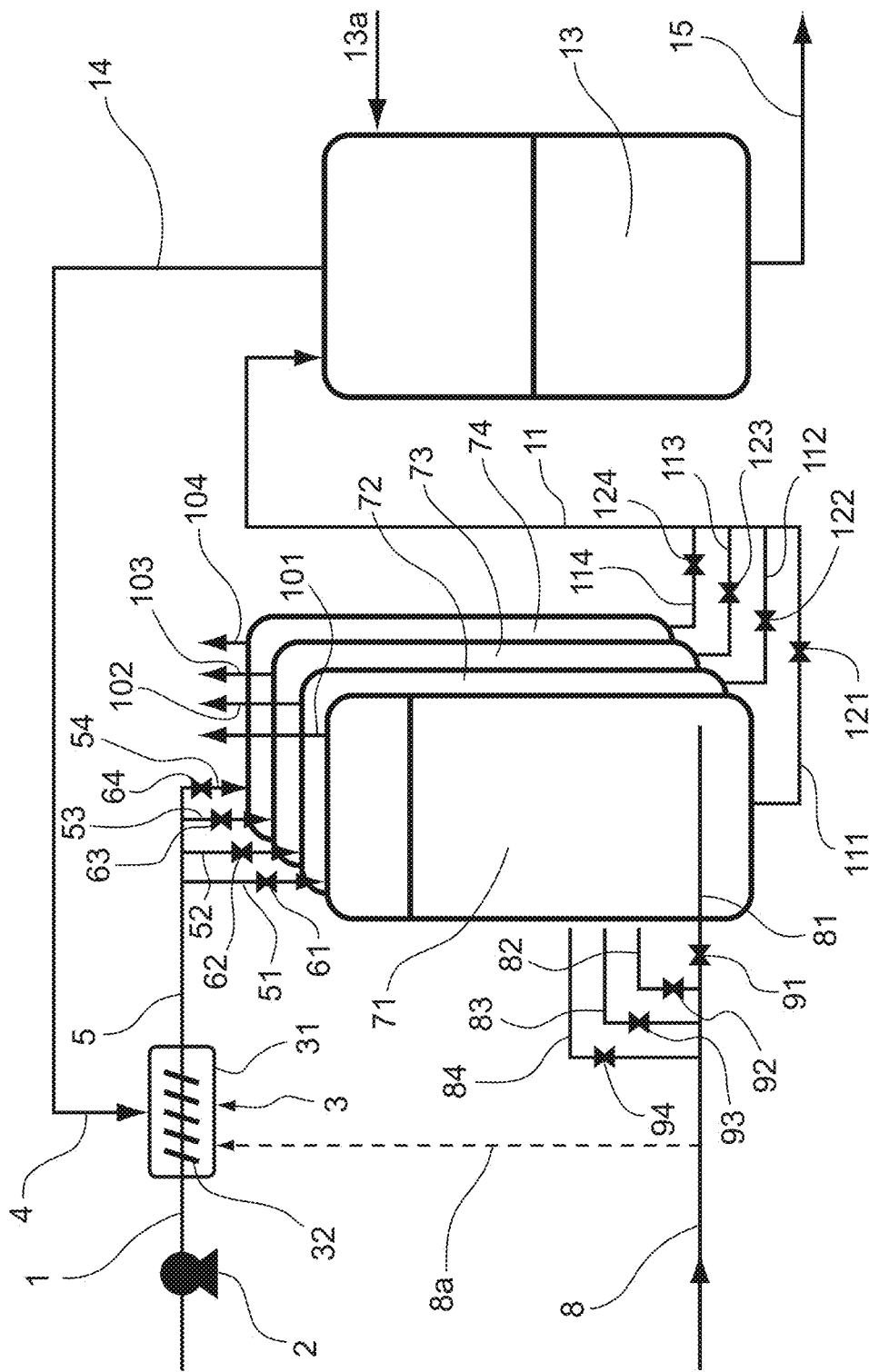
FIG. 1 is a schematic representation of one embodiment of a plant according to the present invention, including four thermal hydrolysis reactors.

Referring to FIG. 1, the embodiment of the plant according to the invention herein described comprises a group of four thermal hydrolysis reactors. It would be noted however that, in other embodiments, the number of thermal hydrolysis reactors, which will always be at least 2, could be different from 4. In practice the number of thermal hydrolysis reactors will preferably range from 2 to 6.

The plant represented comprises a pipe 1 for conveying sludge to be treated to a dynamic mixer 3. To this end, a pump 2 is provided on the pipe 1. These sludges are not preheated.

The dynamic mixer 3 comprises an essentially cylindrical chamber 31 within which there is provided a blade rotor 32. An inlet 4 of recovery steam is also fitted into this dynamic mixer.

The plant furthermore comprises 4 thermal hydrolysis reactors 71, 72, 73, 74. These thermal hydrolysis reactors are identical, and therefore each of them has the same capacity by volume. Each of them is provided in its upper part with discharging means 101, 102, 103, 104 intended for discharging the non-condensable gases coming from the hydrolyzed sludges that they treat.

The plant also comprises a vessel 13 for recovering hydrolyzed sludges coming from the reactors 71, 72, 73, 74. This vessel 13 is a closed vessel provided in its upper part with a pipe 14 connected to the inlet of recovery steam equipping the dynamic mixer 3.

Finally, the plant comprises means 15 for discharging hydrolyzed treated sludges from the vessel 13.

It will be noted that, in the plant described herein, a single dynamic mixer 3 is used to serve the four thermal hydrolysis reactors 71, 72, 73, 74. Specific means are included in the plant to enable the setting up of the fluidic communication of this common dynamic mixer 3 alternately with each of these thermal hydrolysis reactors 71, 72, 73, 74. These means include a pipe 5, one end of which is connected to the dynamic mixer 3 and the other end of which is connected to pipe arms 51, 52, 53, 54 respectively serving the thermal hydrolysis reactors 71, 72, 73, 74. On each of these pipe arms 51, 52, 53, 54 a valve 61, 62, 63, 64 respectively is provided.

The thermal hydrolysis reactors 71, 72, 73, 74 are furthermore provided with means 8 for conveying live steam into their lower part. This live steam is produced out of a boiler (not shown). These means for conveying live steam to the thermal hydrolysis reactors include a pipe 8, one end of which is connected to the boiler and the other end of which is connected to four pipe arms 81, 82, 83, 84 respectively serving the thermal hydrolysis reactors 71, 72, 73, 74. Each of these pipe arms 81, 82, 83, 84 is equipped with a valve 91, 92, 93, 94 respectively. These means are used to supply live steam alternately to each of the thermal hydrolysis reactors 71, 72, 73, 74. The pipe 8 comprises a bypass 8*a* to convey live steam to the dynamic mixer 3 when the plant is started, when no recovery steam is as yet available. The vessel 13 for its part is provided with a water inlet 13*a* to prevent the emission of flash steam when the plant is stopped.

The vessel 13 is connected to the thermal hydrolysis reactors 71, 72, 73, 74 by means for setting up the fluidic communication of this vessel 13 alternately with each of the thermal hydrolysis reactors 71, 72, 73, 74. These means for setting up fluidic communication include a pipe 11 which opens out at one of its ends into the upper part of the recovery vessel 13 and is also connected to the thermal hydrolysis reactors 71, 72, 73, 74 by pipe arms 111, 112, 113, 114 respectively situated in the lower part of each reactor. Each of these pipe arms 111, 112, 113, 114 is equipped with a valve 121, 122, 123, 124 respectively.

First Example of Implementation of the Method

The working of the plant represented in FIG. 1 for implementing this example of a method according to the invention shall now be described.

For the sake of the clarity of this description, this operation shall first of all be described through a description of a treatment cycle implementing one of the reactors of the plant.

According to such a cycle, a batch of sludges is conveyed during a step a) called a filling step, in the absence of any preheating implemented by a heat exchanger and/or a preheating vessel in the thermal hydrolysis reactor 71. To this end, the valves 62, 63, 64 equipping the pipe arms 52, 53, 54 that serve the thermal hydrolysis reactors 72, 73, 74 respectively are closed while the valve 61 equipping the pipe arm 51 serving the reactor 71 is open.

This batch of sludges is pumped through the pump 2 by the pipe 1. It travels through the dynamic mixer 3 where it is intimately mixed with recovery steam provided to the dynamic mixer 3 via the inlet 4 of recovery steam with which this mixer is provided. This passage of the sludges into the dynamic mixer de-structures them, lowering their viscosity and homogenizing them. Thus, the recovery of heat from the hydrolyzed sludges is promoted.

During this step a), called a filling step, the thermal hydrolysis reactor 71 is filled in such a way that, during the step c), the thermal hydrolysis reactor is filled between 70% and 90% of its total capacity by volume. The volume of the interior of the reactor not occupied by sludges is occupied by a gas cloud containing among other things non-condensable gases which are discharged by the pipe 101 provided in the upper part of the reactor during the step a).

It will be noted that, to facilitate the discharge of these non-condensable gases during the step a), it can be planned to provide the pipes 101 with suction means enabling the content of the reactor to be placed in a state of slight low pressure.

In the present example, this step a) lasts 20 minutes.

At the end of this step, the valve 61 which equips the pipe arm 51 conveying the mixture of sludges and steam to the reactor 71 is closed.

Through the invention, according to which the viscosity of the sludges has been reduced and their homogeneity improved through their passage into the dynamic mixer 3, the transfer of energy from the recovery steam into the sludges travelling in the dynamic mixer is optimized. The recovery of energy is therefore optimized.

During a step b), the live steam (water vapor) produced by the boiler is conveyed by the pipe 8 and distributed to the reactor 71 by the pipe arm 81. This injection of live steam is done at the base of the reactor in order to favor its diffusion and its condensation in the sludges. To this end, the valve 91 equipping this pipe arm 81 is open while the valves 92, 93, 94 equipping the pipe arms 82, 83, 84 respectively are closed. This injection of steam within the reactor 71 increases the temperature and the pressure prevailing in this reactor.

In the present embodiment, this step b) for injecting live steam lasts 20 minutes and takes the temperature of the batch of sludges present in the reactor 71 to a temperature of 120° C. to 200° C., preferably 140° C. to 180° C. This thermal hydrolysis temperature could be chosen especially according to the nature of the sludges and the end purpose of the method (hygienization, solubilization, etc). Besides, since the thermal hydrolysis reactor is closed, the injection of steam could also increase the pressure prevailing within this reactor. In practice, this pressure is raised between two and 16 bar(a).

Through the invention, according to which the viscosity of the sludges has been reduced and their homogeneity improved through their passage in the dynamic mixer 3, the transfer of energy from the live steam into the sludges to be hydrolyzed, carried out in the reactor, is also optimized. The sludges are therefore heated more easily and the consumption of live steam is optimized.

During this step b) for injecting live steam, the vessel 13 is not in fluidic communication with the interior of the reactor 71. The valve 121, equipping the pipe arm 111 extended by the pipe 11 leading into the vessel 13, is therefore closed.

During a step c), known as a thermal hydrolysis reaction step, which in this example also lasts 20 minutes, the thermal hydrolysis of the sludges takes place, and the valve 16 and the valve 121 remain closed.

Through the invention, in which the viscosity of the sludges has been diminished and their homogeneity improved through their passage into the dynamic mixer 3, the transfer of energy from the steam into the sludges is also optimized during this step.

At the end of this step c), the valve 121 is open. This gives rise, during a step d), to the emptying of the content of the batch of hydrolyzed sludges contained in the reactor 71 towards the recovery vessel 13 and the depressurizing of the reactor. This depressurizing is permitted by the fact that the vessel 13 has pressure that is far lower than the pressure prevailing within the hydrolysis reactor 71 during the step c) of thermal hydrolysis. In practice, this pressure prevailing inside the vessel 13 ranges from 1.1 bar(a) to 3 bar(a). During this step d) for emptying the content of the batch of hydrolyzed sludges from the reactor towards the vessel 13, the depressurizing of the sludges causes the emission of recovery steam. This recovery steam is discharged from the vessel 13 by the pipe 14 which is itself connected to the inlet of recovery steam from the dynamic mixer 3. At the end of this step d), the hydrolyzed sludges are discharged from the plant by the pipe 15. This step d) also lasts 20 minutes.

In the present embodiment, the steps a), b), c) and d) each have a duration of 20 minutes and constitute an 80-minute treatment cycle.

This cycle is immediately repeated for one and then for other batches of sludges to be treated in the reactor 71. The treatments of different batches of sludges succeed one another therefore during a succession of 80-minute cycles during which these different batches of sludges travel through the reactor 71.

Figure 2:
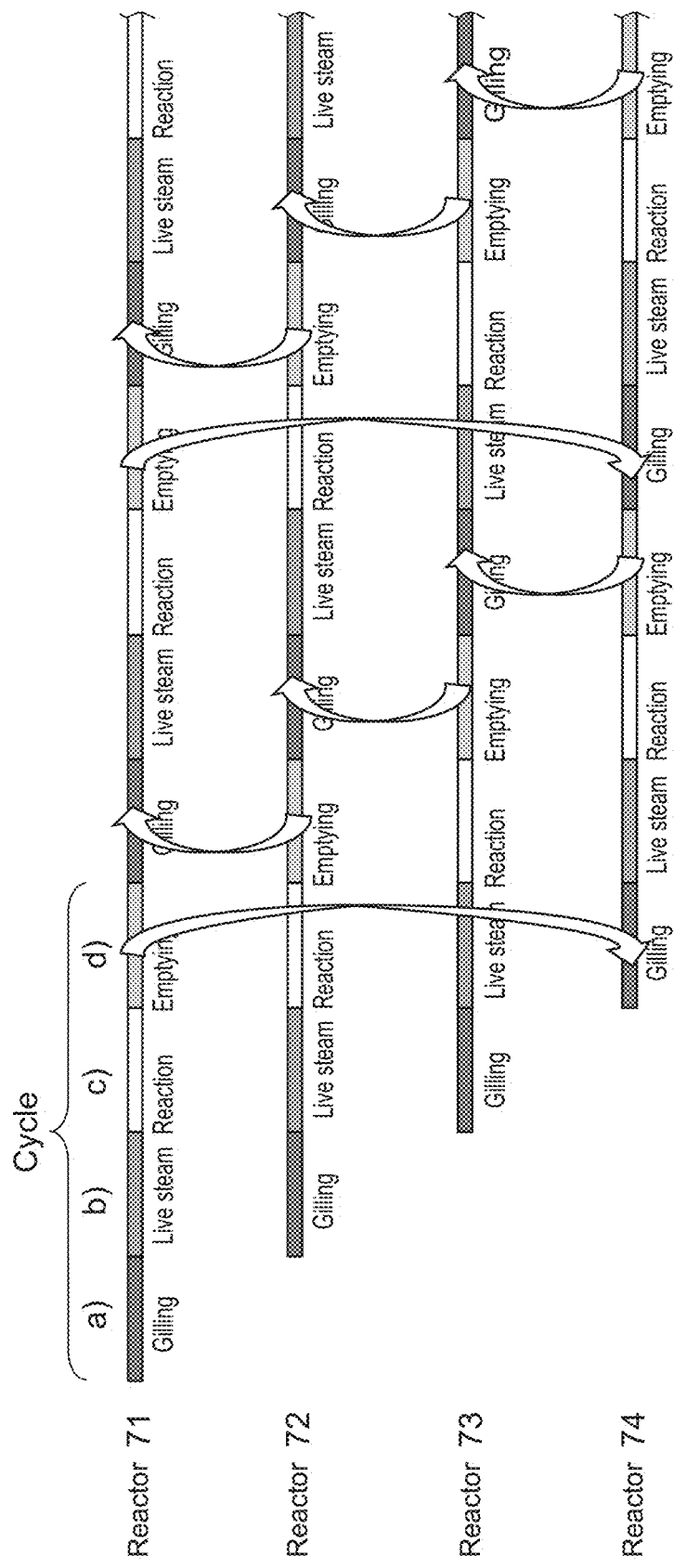
FIG. 2 represents a block diagram for implementing the plant of FIG. 1 using an example of a method according to the invention.

This succession of cycles is symbolized in FIG. 2 by the upper line designated by the letter A of this line. In this figure, the steps a) for filling are represented in black; the steps b) for injecting live steam are represented in dark grey; the steps c) of thermal hydrolysis reaction are represented as blanks and the steps d) for emptying and de-pressurizing are represented in light grey.

Identical successions of treatment cycles are implemented for other batches of sludges through the reactors 72, 73, 74 (provided with means 102, 103, 104 for discharging non-condensable gases). The successions of cycles are symbolized in FIG. 2 by the lines B, C, D. The description of the cycles of these successions of cycles is identical to that made here above with reference to the reactor 71, except that it is the valves associated with the reactor 72, 73, 74 that are activated, namely:

the valve 62 provided on the pipe arm 52, the valve 92 provided on the pipe arm 82 and the valve 122 provided on the pipe arm 112 for the treatment cycle implemented through the reactor 72;

the valve 63 provided on the pipe arm 53, the valve 93 provided on the pipe arm 83 and the valve 123 provided on the pipe arm 113 for the treatment cycle implemented through the reactor 73;

the valve 64 provided on the pipe arm 54, the valve 94 provided on the pipe arm 84 and the valve 124 provided on the pipe arm 114 for the treatment cycle implemented through the reactor 74.

According to the method of the invention, the beginnings of the cycles of these different successions A, B, C, D of cycles are staggered in time so that the steps a) of a succession of cycles are concomitant with the steps d) of another succession of cycles, the recovery steam emitted during the steps d) of one succession of cycles constituting the recovery steam injected during the steps a) of another succession of cycles. This is symbolized in FIG. 2 by curved arrows. In the present example, the cycle starting points of each succession of cycles are staggered by 20 minutes.

Thus, referring to FIG. 2, the recovery steam emitted during the steps d) of the succession of cycles A, constitutes the recovery steam injected during the step a) of the succession of cycles D, the recovery steam emitted during the steps d) of the succession of cycles B constitutes the recovery steam injected during the steps a) of the succession of cycles A, the recovery steam emitted during the steps d) of the succession of cycles C constitutes the recovery steam injected during the steps a) of the succession of cycles B, the recovery steam emitted during the steps d) of the succession of cycles D constitutes the recovery steam injected during the steps a) of the succession of cycles C, etc.

The feeding of sludges into the plant, the feeding of live steam in alternation into each thermal hydrolysis reactor and the discharge of sludges from the plant are thus continuous.

Second Example of Implementation of the Method

In this example of an embodiment, the reactor 74 is stopped and only the thermal hydrolysis reactors 71, 72 and 73 of the plant are used to implement the method according to the invention.

Figure 3:
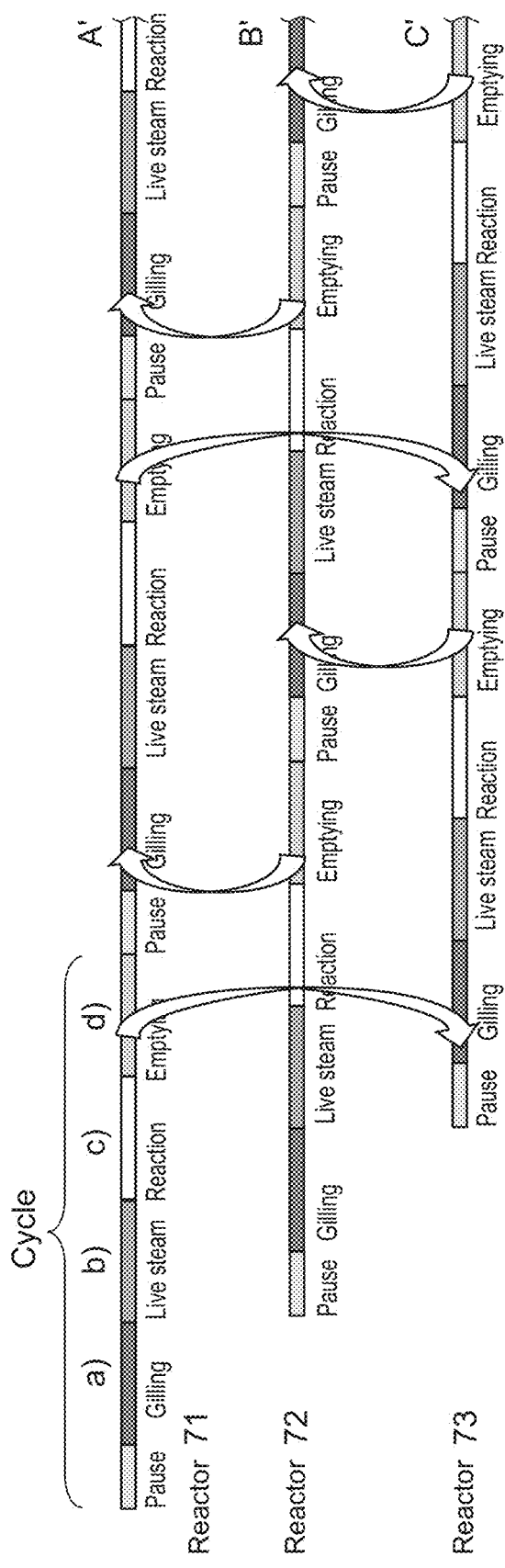
FIG. 3 represents a block diagram for implementing the plant of FIG. 1 by means of another example of a method according to the invention.

Besides, the treatment cycle has been increased by integrating a ten-minute pause at the end of each step d) of emptying and depressurizing, the steps a), b), c) and d) lasting 20 minutes. The succession of such 90-minute cycles is symbolized in FIG. 3 by the lines A', B', C'.

Comparison with the Prior Art

Sludges were treated according to the first example of implementation of the method of the invention described here above on the one hand and by the technique described in FR2820735 on the other hand, the duration of the thermal hydrolysis step being 20 minutes in both cases.

The invention made it possible, using the results of these comparative tests, to notably shorten the processing cycles, in practice from 120 minutes (for the technique according to FR2820735) to 80 minutes (for the invention implemented according to the first example of implementation of the method according to this example described here above).

Figure 4:
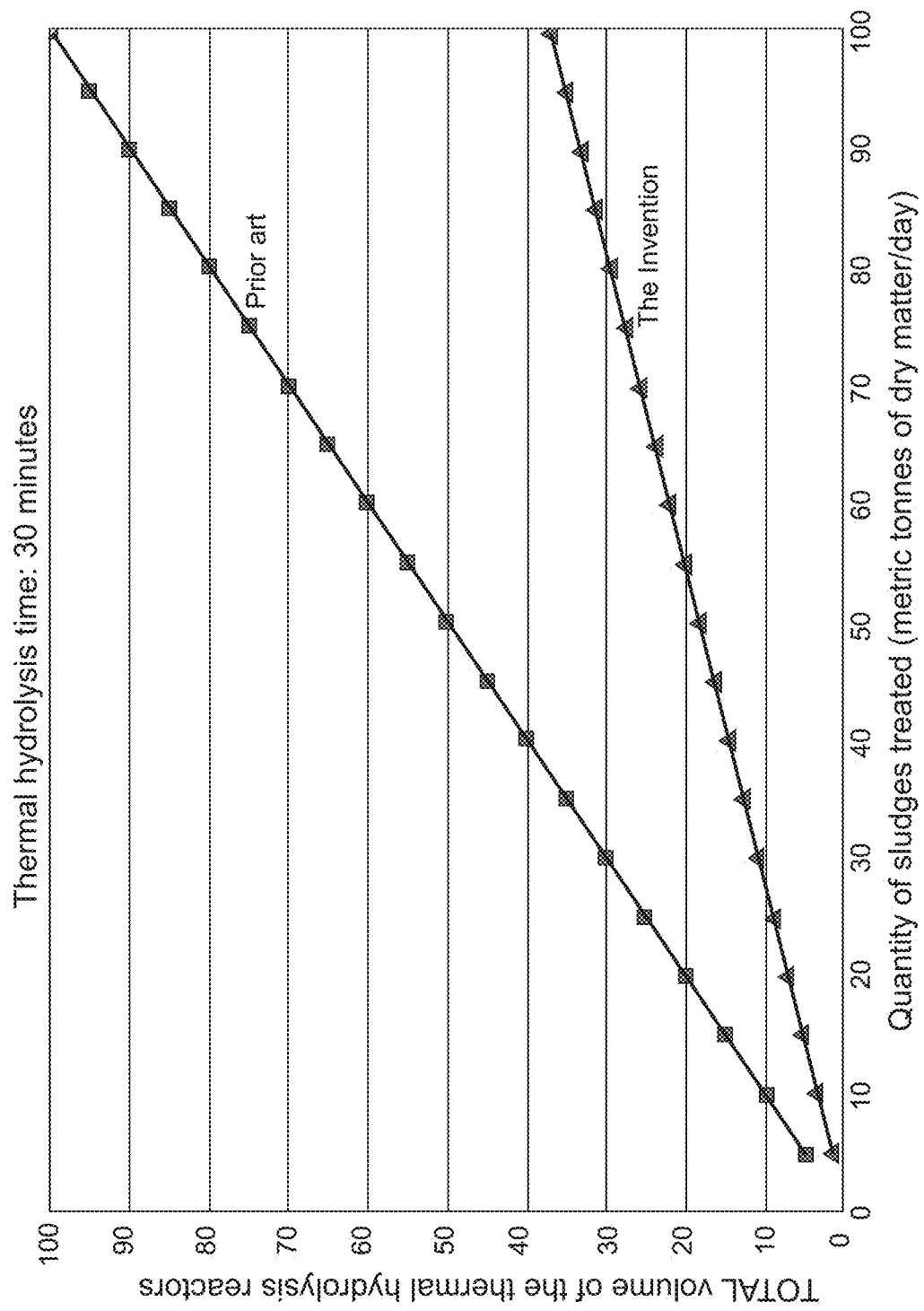
FIG. 4 is a graph illustrating the results of comparative tests obtained by means of the invention on the one hand and by means of the prior art as described in FR2820735 on the other hand.

The volumes of reactors needed for the treatment of these sludges were compared. The graph of FIG. 4 which expresses the totalized volumes of the thermal hydrolysis reactors needed for the treatment of these sludges shows that these volumes are far less in the context of the invention.

As compared with the prior art, it will be noted that the invention does not entail the need to keep, in the thermal hydrolysis reactors, a quantity of hot sludges between each cycle, thus optimizing the quantities of sludges treated in each reactor and the filling of these reactors.

The invention claimed is:

1. A method of thermally hydrolyzing sludge in a group of thermal hydrolysis reactors wherein the method comprises a succession of cycles where each cycle is dedicated to one of the thermal hydrolysis reactors of the group, each cycle comprising:
  (i) in the absence of pre-heating the sludge, continuously pumping the sludge into and through a dynamic mixer having a chamber and motor driven blades contained in the chamber;
  (ii) injecting recovered steam from a steam recovery vessel into the dynamic mixer;
  (iii) destructuring the sludge by driving the blades in the chamber of the dynamic mixer at a speed greater than 500 rpm and homogenizing the sludge and steam in the chamber and yielding a single phase mixture of sludge and recovered;
  (iv) directing the sludge from the dynamic mixer to one thermal hydrolysis reactor of the group of thermal hydrolysis reactors;
  (v) injecting live steam into said one thermal hydrolysis reactor and increasing the temperature and pressure in said one thermal hydrolysis reactor;
  (vi) thermally hydrolyzing the sludge in said one thermal hydrolysis reactor;
  (vii) after the sludge has been thermally hydrolyzed in said one thermal hydrolysis reactor, directing the sludge from said one thermal hydrolysis reactor to said steam recovery vessel and decreasing the pressure in said one thermal hydrolysis reactor causing the emission of the recovered steam in the steam recovery vessel which constitutes the recovered steam used in the dynamic mixer; and
  wherein said cycle and the steps (i-vii) are repeated one after the other for each of the other thermal hydrolysis reactors of the group of thermal hydrolysis reactors.

2. The method according to claim 1 wherein the blades only destructure the sludge and do not push the sludge through the dynamic mixer; and wherein the method includes continuously pumping the sludge through the dynamic mixer such that the sludge continuously moves through the dynamic mixer and is not retained therein.

3. The method according to claim 2 wherein the dynamic mixer is not a tank but includes a chamber having a volume through which the sludge is continuously moved.

4. The method according to claim 1 where the sludge directed into the dynamic mixer includes a dry solids content of 15%-35% (wt.).

5. The method according to claim 1 further including maintaining the pressure in the steam recovery vessel lower than the pressure in said first thermal hydrolysis reactor.

6. The method according to claim 1 including producing non-condensable gases in said one thermal hydrolysis reactors and venting the non-condensable gases from a top portion of said one thermal hydrolysis reactor.

7. The method according to claim 1 including maintaining the pressure within said one thermal hydrolysis reactor at 3.5-10 bar (a) while the sludge is being thermally hydrolyzed therein; and maintaining the pressure inside the steam recovery vessel at 1.1-3 bar (a).

8. A method of thermally hydrolyzing sludge in a group of thermal hydrolysis reactors characterized in that the method comprises successions of cycles, each of these successions of cycles being dedicated to one of said thermal hydrolysis reactors, each cycle comprising:
  a step a) for conveying a batch of non-preheated sludge to be treated into a thermal hydrolysis reactor, said step for conveying comprising the continuous passage of said batch of sludge into a dynamic mixer into which recovery steam is injected and wherein the dynamic mixer comprises a chamber and motor driven blades contained in the chamber;
  a step b) destructuring the sludge by driving the blades in the chamber of the dynamic mixer at a speed greater than 500 rpm and homogenizing the sludge and steam in the chamber and yielding a single phase mixture of sludge and recovered steam;
  a step c) for injecting live steam into said thermal hydrolysis reactor containing said batch of sludge so as to increase the temperature and the pressure prevailing in this reactor;
  a step d) of thermal hydrolysis of said batch of sludge in said thermal hydrolysis reactor;
  a step e) for emptying the contents of said batch of hydrolyzed sludge of said thermal hydrolysis reactor into a recovery vessel and for concomitantly de-pressurizing said reactor prompting the emission of recovery steam from said recovery vessel;

the cycle starting points of the successions of cycles being staggered in time so that the steps a) of a succession of cycles are concomitant with the steps d) of another succession of cycles, and the recovery steam emitted during the steps d) of a succession of cycles constituting the recovery steam injected during the steps a) of another succession of cycles.

9. The method according to claim 8 characterized in that said sludge to be treated has a dryness of 10% to 35% by weight of dry matter.

10. The method according to claim 8 characterized in that the method comprises a discharging of non-condensable gases from said thermal hydrolysis reactor during said steps a) and d).

11. The method according to claim 8 characterized in that the duration of the step a) is from 5 to 30 min, the duration of the step b) is from 5 to 30 min, the duration of the step d) is from 5 to 30 min, and the duration of the step c) is from 5 to 120 min.

12. The method according to claim 8 characterized in that, during the step c) of thermal hydrolysis, the temperature of said batch of sludge is from 120° C. to 200° C.

13. The method according to claim 8 characterized in that, during the step c) of thermal hydrolysis, the pressure inside the thermal hydrolysis reactor is from 2 to 16 bar(a).

14. The method according to claim 8 characterized in that the pressure inside the recovery vessel is maintained at 1.1 to 3 bar(a).

15. The method according to claim 8 characterized in that said step a) is implemented in such a way that, during the step c), the thermal hydrolysis reactor is filled to between 70% and 95% of its total capacity by volume.

\* \* \* \* \*